(12) United States Patent
Gale et al.

(10) Patent No.: US 11,782,384 B2
(45) Date of Patent: Oct. 10, 2023

(54) HOLOGRAPHIC RECORDINGS REPLAYING IMAGES UPON ILLUMINATION

(71) Applicant: H010 LIMITED, Croydon (GB)

(72) Inventors: Charles Franklin Gale, Croydon (GB); Martin John Richardson, Croydon (GB)

(73) Assignee: H010 Limited, Croydon (GB)

( * ) Notice: Subject to any disclaimer, the term of this patent is extended or adjusted under 35 U.S.C. 154(b) by 0 days.

(21) Appl. No.: 16/757,686

(22) PCT Filed: Oct. 22, 2018

(86) PCT No.: PCT/GB2018/053044
§ 371 (c)(1),
(2) Date: Apr. 20, 2020

(87) PCT Pub. No.: WO2019/077376
PCT Pub. Date: Apr. 25, 2019

(65) Prior Publication Data
US 2020/0333745 A1  Oct. 22, 2020

(30) Foreign Application Priority Data
Oct. 20, 2017 (GB) ..................... 1717285

(51) Int. Cl.
*G03H 1/00* (2006.01)
*G03H 1/02* (2006.01)
*G06K 19/06* (2006.01)

(52) U.S. Cl.
CPC ......... *G03H 1/0011* (2013.01); *G03H 1/0248* (2013.01); *G03H 1/0252* (2013.01);
(Continued)

(58) Field of Classification Search
USPC ............................................... 359/2
See application file for complete search history.

(56) References Cited

U.S. PATENT DOCUMENTS 4,079,854 A   3/1978 Shaw et al.
4,999,234 A * 3/1991 Cowan ................ G03H 1/28
                                                430/1
(Continued)

FOREIGN PATENT DOCUMENTS

CN   104656167 A   5/2015
CN   105243379 A   1/2016
(Continued)

OTHER PUBLICATIONS

International Searching Authority in connection with PCT/GB2018/053044 filed Oct. 22, 2018, "International Preliminary Report on Patentability", 14 pages, dated Apr. 21, 2020.
(Continued)

*Primary Examiner* — Jennifer D. Carruth
(74) *Attorney, Agent, or Firm* — McKee, Voorhees & Sease, PLC

(57) ABSTRACT

There are provided volume holograms and combinations of lenticular lenses and holograms in particular for security applications. In embodiments, a volume hologram comprises a holographic medium (102) including a first optical interference structure which, upon illumination, replays a first image (110); wherein the first image includes a lenticular lens layer (111) including an array of lenticules and a lenticular image layer (113) including first (114) and second (115) interlaced images corresponding with the array of lenticules.

6 Claims, 7 Drawing Sheets

(52) U.S. Cl.
CPC . *G06K 19/06037* (2013.01); *G06K 19/06065* (2013.01); *G03H 2001/0022* (2013.01); *G03H 2001/0216* (2013.01); *G03H 2210/53* (2013.01); *G03H 2223/19* (2013.01)

(56) References Cited

U.S. PATENT DOCUMENTS

| | | | |
|---|---|---|---|
| 5,712,731 | A | 1/1998 | Drinkwater et al. |
| 2002/0163678 | A1 | 11/2002 | Haines et al. |
| 2004/0121241 | A1* | 6/2004 | Kodama ............... G03H 1/0248 430/1 |
| 2005/0161512 | A1* | 7/2005 | Jones ..................... B42D 25/41 235/487 |
| 2005/0232125 | A1* | 10/2005 | Kuroda ................. G11B 7/128 |
| 2005/0248817 | A1 | 11/2005 | Weaver et al. |
| 2006/0022059 | A1 | 2/2006 | Juds |
| 2008/0084592 | A1 | 4/2008 | Boden et al. |
| 2008/0100890 | A1* | 5/2008 | Curtis .................... G03H 1/265 359/30 |
| 2009/0207465 | A1* | 8/2009 | Riddle .................... G03H 1/26 359/2 |
| 2010/0033779 | A1 | 2/2010 | Kurashige |
| 2010/0123943 | A1 | 5/2010 | Umemoto et al. |
| 2010/0328741 | A1 | 12/2010 | Cheverton et al. |
| 2013/0050819 | A1 | 2/2013 | Holmes |
| 2013/0099474 | A1 | 4/2013 | Fuhse et al. |
| 2013/0193679 | A1 | 8/2013 | Fuhse et al. |
| 2013/0229697 | A1 | 9/2013 | Brown et al. |
| 2013/0250382 | A1* | 9/2013 | Wiltshire ................ G03H 1/24 359/23 |
| 2013/0301090 | A1* | 11/2013 | Flynn ..................... G03H 1/202 359/9 |
| 2014/0340723 | A1 | 11/2014 | Matsubara et al. |
| 2015/0069748 | A1 | 3/2015 | Batistatos et al. |
| 2015/0183257 | A1 | 7/2015 | Glendenning et al. |
| 2016/0075164 | A1 | 3/2016 | Sarrazin |
| 2018/0144160 | A1 | 5/2018 | Shirakura |
| 2018/0276523 | A1 | 9/2018 | Okada et al. |

FOREIGN PATENT DOCUMENTS

| | | | |
|---|---|---|---|
| EP | 2631085 | A1 | 8/2013 |
| GB | 2317237 | A | 3/1998 |
| GB | 2472031 | A | 1/2011 |
| JP | 651124 | A | 2/1994 |
| JP | 11133232 | A | 5/1999 |
| JP | 2010131878 | A | 6/2010 |
| JP | 2011128369 | A | 6/2011 |
| KR | 101206425 | B1 | 11/2012 |
| WO | 9427254 | A1 | 11/1994 |
| WO | 2010046687 | A1 | 4/2010 |
| WO | 2011051668 | A1 | 5/2011 |
| WO | 2011051670 | A2 | 5/2011 |
| WO | 2013167887 | A1 | 11/2013 |
| WO | 2017092667 | A1 | 6/2017 |

OTHER PUBLICATIONS

International Searching Authority in connection with PCT/GB2018/053044 filed Oct. 22, 2018, "The International Search Report and the Written Opinion of the International Searching Authority, or the Declaration", 24 pages, dated Mar. 19, 2019.

International Search Authority in connection with PCT/GB2018/053044 filed Oct. 22, 2018, "International Search Report", 9 pages, dated Mar. 19, 2019.

International Search Authority in connection with PCT/GB2018/053044 filed Oct. 22, 2018, "Written Opinion of the International Searching Authority", 13 pages, dated Mar. 19, 2019.

Novavision, The Wayback Machine—https://web.archive.org/web/20170709061507/https7/www.novavisioninc.com/pages/lear, 9 pages, 2017.

* cited by examiner

HOLOGRAPHIC RECORDINGS REPLAYING IMAGES UPON ILLUMINATION

CROSS REFERENCE TO RELATED APPLICATIONS

This is a U.S. national phase application claiming priority to PCT/GB2018/053044, filed Oct. 22, 2018, which claims priority to British application No. 1717285.9, filed Oct. 20, 2017, the entire contents of which are hereby incorporated by reference in their entirety.

FIELD

This specification relates to holograms. In particular, although not exclusively, this specification relates to secure holograms. Further, it is a non-exclusive object of this specification to provide secure holograms which may be an indicator of authenticity and/or difficult or impossible to copy.

BACKGROUND

It is known to include holograms on articles or their packaging or labelling to indicate authenticity. However, some holograms can be copied. It is a non-exclusive object to provide a hologram that is a reliable indicator of authenticity and/or is difficult or impossible to copy.

SUMMARY

There is provided volume hologram including a holographic medium,
the holographic medium including a first optical interference structure which upon illumination replays a first image; and
the first image including a lenticular lens layer including an array of lenticules and a lenticular image layer including first and second interlaced images corresponding with the array of lenticules.

The first interlaced image may include first data.
The second interlaced image may include second data.
The first and/or second data may include security, verification, validation, identification and/or authentication data.
The lenticular image layer may include at least one further interlaced image corresponding with the array of lenticules
The at least one further interlaced image may include further data.
The further data may include security, verification, validation, identification and/or authentication data.
At least two of the first, second, and/or further data may contain co-encrypted elements.
The first optical interference structure may replay the first image upon illumination with a first wavelength of light; and the holographic medium may further include a second optical interference structure which replays a second image upon illumination with a second wavelength of light.
The first optical interference structure may replay the first image upon illumination at a first angle; and the holographic medium may further include a second optical interference structure which replays a second image upon illumination at a second angle.
The first optical interference structure may replay the first image at a first apparent depth upon illumination; and the holographic medium may further include a second optical interference structure which replays a second image at a second apparent depth upon illumination.

There is also provided a method of making a volume hologram, the method including recording in a holographic medium a first optical interference structure which replays an image of a lenticular lens layer including an array of lenticules and a lenticular image layer including first and second interlaced images corresponding with the array of lenticules.

There is also provided a combination of a lenticular lens layer on a hologram,
the lenticular lens layer including an array of lenticules; and
the hologram including a holographic medium lenticular image layer, the lenticular image layer including first and second interlaced interference structures corresponding with the array of lenticules;
wherein the first interference structure replays a first image upon illumination; and
the second interference structure replays a second image upon illumination.

The first image may include first data.
The second image may include second data.
The first and/or second data may include security, verification, validation, identification and/or authentication data.
The holographic medium may include at least one further interlaced interference structure corresponding with the array of lenticules; and the at least one further interlaced interference structure may replay a further image upon illumination.
The at least one further interlaced image may include further data.
The further data may include security, verification, validation, identification and/or authentication data.
At least two of the first, second, and/or further data may contain co-encrypted elements.

There is also provided method of making a combination, the method including providing a lenticular lens layer including an array of lenticules and a hologram including a holographic medium; and
recording in the holographic medium a lenticular image layer, the recording including:
recording in the holographic medium a first optical interference structure which replays a first image upon illumination; and
recording in the holographic medium a second optical interference structure which replays a second image upon illumination;
wherein the first and second optical interference structures are interlaced interference structures and correspond with the array of lenticules.

There is also provided volume hologram including a holographic medium,
the holographic medium including:
a first optical interference structure which replays a first image including first data upon illumination with a first wavelength of light; and
a second optical interference structure which replays a second image including second data upon illumination with a second wavelength of light.

The holographic medium may further include at least one further optical interference structure which replays a further image including further data upon illumination with a further wavelength of light.

The first, second, and/or further data may include security, verification, validation, identification and/or authentication data.

The first, second and/or further data may contain co-encrypted elements.

The first, second, and/or further image may include a lenticular lens layer including an array of lenticules and a lenticular image layer including first and second interlaced images corresponding with the array of lenticules.

The first optical interference structure may replay the first image upon illumination at a first angle; and the second optical interference structure may replay the second image upon illumination at a second angle.

The at least one further optical interference structure may replay the further image upon illumination at a further angle.

The first optical interference structure may replay the first image at a first apparent depth upon illumination; and the second optical interference may structure replay the second image at a second apparent depth upon illumination.

The at least one further optical interference structure may replay the further image at a further apparent depth upon illumination.

There is also provided a method of making a volume hologram, the method including recording in a holographic medium a first optical interference structure which replays a first image including first data upon illumination with a first wavelength of light and recording a second optical interference structure which replays a second image including second data upon illumination with a second wavelength of light.

The method may further include recording in the holographic medium at least one further optical interference structure which replays a further image including further data upon illumination with a further wavelength of light.

There is also provided a volume hologram including a holographic medium, the holographic medium including:
 a first optical interference structure which upon illumination at a first angle replays a first image including first data; and
 a second optical interference structure which upon illumination at a second angle replays a second image including second data.

The holographic medium may further include at least one further optical interference structure which upon illumination at a further angle replays a further image including further data.

The first, second, and/or further data may include security, verification, validation, identification and/or authentication data.

The first, second, and/or further data may contain co-encrypted elements.

The first, second and/or further image may include a lenticular lens layer including an array of lenticules and a lenticular image layer including first and second interlaced images corresponding with the array of lenticules.

The first optical interference structure may replay the first image upon illumination with a first wavelength of light; and the second optical interference structure may replay the second image upon illumination with a second wavelength of light.

The at least one further optical interference structure may replay the further image upon illumination with a further wavelength of light.

The first optical interference structure may replay the first image at a first apparent depth upon illumination; and the second optical interference structure may replay the second image at a second apparent depth upon illumination.

The at least one further optical interference structure may replay the further image at a further apparent depth upon illumination.

There is also provided a method of making a hologram, the method including recording in a holographic medium a first optical interference structure which replays a first image including first data upon illumination at a first angle and recording a second optical interference structure which replays a second image including second data upon illumination at a second angle.

There is also provided a volume hologram including a holographic medium,
 the holographic medium including:
  a first optical interference structure which upon illumination replays a first image including first data at a first apparent depth; and
  a second optical interference structure which upon illumination replays a second image including second data at a second apparent depth.

The holographic medium may further include at least one further optical interference structure which upon illumination replays a further image including further data.

The first, second, and/or further data may include security, verification, validation, identification and/or authentication data.

The first, second, and/or further data may contain co-encrypted elements.

The first, second, and/or further image may include a lenticular lens layer including an array of lenticules and a lenticular image layer including first and second interlaced images corresponding with the array of lenticules.

The first optical interference structure may replay the first image upon illumination with a first wavelength of light; and the second optical interference structure may replay the second image upon illumination with a second wavelength of light.

The at least one further optical interference structure may replay the further image upon illumination with a further wavelength of light.

The first optical interference structure may replay the first image upon illumination at a first angle; and the second optical interference structure may replay the second image upon illumination at a second angle.

The at least one further optical interference structure may replay the further image upon illumination at a further angle.

There is also provided a method of making a volume hologram, the method including recording in a holographic medium a first optical interference structure which replays a first image including first data at a first apparent depth and recording a second optical interference structure which replays a second image including second data at a second apparent depth.

There is also provided a security marker including a hologram described herein and/or a combination as described herein.

There is also provided an article including a hologram described herein and/or a combination as described herein.

There is also provided packaging or labelling including a hologram described herein and/or a combination described herein.

There is also provided article and packaging or labelling described herein.

BRIEF DESCRIPTION OF THE DRAWINGS

Embodiments of the holograms and combinations of the present specification will now be described with reference to the accompanying drawings, in which.

DETAILED DESCRIPTION

Surface holograms may be copied by embossing. Such a process typically involves electrodeposition of nickel on a holographic medium. The nickel layer is then separated from the hologram and used to stamp further holograms.

Volume holograms, however, cannot be copied by embossing. This is because the optical interference structure is within the plane of the holographic medium and not on the surface of the hologram. Therefore, a volume hologram is intrinsically more difficult to copy than a surface hologram. However, volume holograms can be copied optically. This specification, therefore, seeks to provide volume holograms which are difficult or impossible to copy optically.

Figure 1:
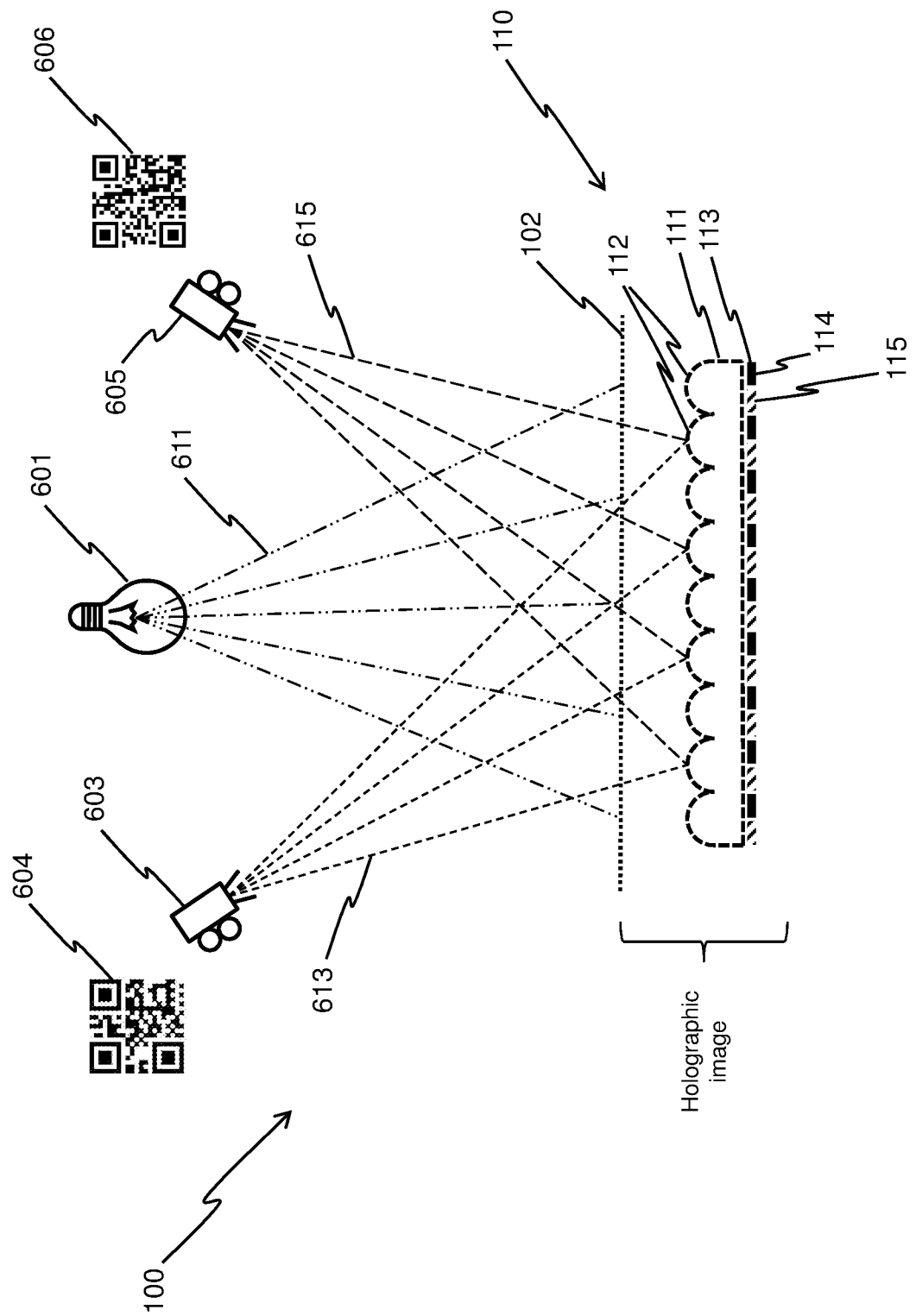
FIG. 1 shows a schematic illustration of an embodiment of a hologram including an optical interference structure which replays a first image including a lenticular lens layer and a lenticular image layer.

Referring firstly to FIG. 1, there is shown a volume hologram 100 including a holographic medium 102. The volume hologram 100 may be an image plane volume hologram.

The holograms provided by this specification have broad applicability and can be made from a broad range of known volume hologram materials. For example, the volume holographic medium 102 can be or can comprise a photopolymer.

The holographic medium 102 includes a first optical interference structure which upon illumination replays a first image 110. The first image 110 is illustrated schematically in FIG. 1 as it may be viewed by an observer.

However, it must be understood that the first image 110 is replayed by the first optical interference structure of the holographic medium 102; the first image 110 is not a physical entity within the hologram, although it is illustrated as such in FIG. 1 for explanatory purposes.

The first image 110 includes a lenticular lens layer 111 including an array of lenticules 112 and a lenticular image layer 113. The lenticular image layer 113 includes a first interlaced image 114 and a second interlaced image 115. The first and second interlaced images 114,115 correspond with the array of lenticules 112.

The volume hologram 100 could be described as follows: A volume hologram 100 including a holographic medium 102, the holographic medium 102 including a first optical interference structure which upon illumination replays a first image 110 at a first depth in the z-direction; and the first image including a holographic lenticular lens layer 111 containing two interlaced images 114,115. In other words, the first image 11 may be at a first depth in the z-direction. And/or the first image may be described as including a holographic lenticular lens layer. And/or the lenticular lens layer may be described as containing two interlaced images (e.g. the first and second interlaced images 114,115).

Because the first and second interlaced images 114,115 correspond with the array of lenticules 112, when viewed from a first angle the first interlaced image 114 is viewable and when viewed from a second angle the second interlaced image 115 is viewable. This is illustrated in FIG. 1, in which the hologram 100 is shown illuminated with a light 601. The light 601 may be any suitable light which can illuminate the hologram 100 in such a way that the holographic medium 102 replays the first image 110. For instance, the light 601 may be a white light, such as, for example, a tungsten halogen spot. When viewed from a first location, and thereby a first angle, for example when viewed by a first camera 603, the first interlaced image 114 is viewable. When viewed from the first location the first interlaced image 114 can appear as a complete image. A possible view 604 of the complete image of the first interlaced image 114 is shown in FIG. 1 adjacent the camera 603. Similarly, when viewed from a second location, and thereby a second angle, for example when viewed by a second camera 605 the second interlaced image 115 is viewable. When viewed from the second location the second interlaced image 115 can appear as a complete image. A possible view 606 of the complete image of the second interlaced image 115 is shown in FIG. 1 adjacent the camera 606.

It will be appreciated, therefore, that the hologram 100 may be advantageous. First, the hologram may replay both first and second interlaced images 114,115 with a smaller holographic medium than might be required to replay both first and second interlaced images 114,115 if they were not interlaced, for example if the images were arranged side-by-side. The hologram 100 can therefore provide an environmental benefit, in that less holographic medium may be required in order to replay a given size of total image.

Additionally, a conventional hologram may have a rather short parallax. For example, a 10 cm$^2$ hologram may have a parallax of 5 cm. By replaying a first image 110 including a lenticular lens layer 111 including an array of lenticules 112 and a lenticular image layer 113, the parallax of the hologram 100 may be effectively expanded.

Further, optical copying of the hologram can be made more difficult. First, when attempting to copy the hologram optically any small errors, for example errors in parallax, within the copy are more likely to be apparent as the possible first and second views 604,605 may be more likely to show up small copying errors. Second, reconstruction of a real version of the first image 110 from the hologram 100 is likely made difficult, as reconstruction involves reconstructing three components: the array of lenticules 112, the first interlaced image 114, and the second interlaced image 115. Further, the relative arrangement of the three components must be correct in order to display the first interlaced image 114 and the second interlaced image 115. It will be appreciated that although the lenticular lens layer 111 including the array of lenticules 112 is easily observable in the schematic view of FIG. 1, this may not be the case when observing the hologram 100. As the real lenticular lens layer which is used to construct the hologram 100 may be transparent, it will also be transparent within the image 110 replayed by the holographic medium 102 of the hologram 100. As will be appreciated, reconstructing the lenticular lens layer 111 from observation of the hologram 100 will be difficult if it cannot be observed.

In FIG. 1, light waves 611 from the light 601 are shown incident upon the holographic medium 102 of the hologram 100. Further, light waves 613 replayed by the holographic medium 102 of the hologram 100 are shown traveling towards the first camera 603. These light waves 613 are shown emanating from the first image 110 for explanatory purposes. However, it will be appreciated that the light waves 613 in fact emanate from the holographic medium 102 of the hologram, specifically from the first optical interference structure of the holographic medium 102. Similarly, light waves 615 are shown emanating from the first image 110. However, the light waves 615 in fact emanate from the holographic medium 102 of the hologram, specifically from the first optical interference structure of the holographic medium 102.

The first interlaced image 114 may include first data. The first data may be contained within the first interlaced image 114 by any suitable means. For example, as represented in FIG. 1, the first interlaced image 114 may contain and/or be a QR code, as can be seen in the first view 604. Although any other means may be used, for example, other types of matrix barcodes or linear barcodes or high capacity colour barcodes. Other means for including data within images are known and may be used with the hologram 100.

The second interlaced image 115 may include second data. As with the first data, the second data may be contained within the first interlaced image 114 by any suitable means. For example, as represented in FIG. 1, the second interlaced image 115 may contain and/or be a QR code, as can be seen in the second view 605. Again, any other means may be used, for example, other types of matrix barcodes or linear barcodes or high capacity colour barcodes. Other means for including data within images are known and may be used with the hologram 100.

The first and/or second data may include security, verification, validation, identification and/or authentication data. Inclusion of such data may be advantageous, in that having such data within the hologram 100 can allow, for example, secure access to an electronic system or to a physical entity or other secure environment. Alternatively, such data may be used either to verify or validate the identity of the holder of the hologram 100 and/or to verify the origin of goods to which the hologram 100 is affixed, for example. Alternatively, such data may be used to identify the holder of the hologram 100 and/or to identify the origin of goods to which to which the hologram 100 is affixed, for example. Alternatively, such data may be used to authenticate the identity of the holder of the hologram 100 and/or to authenticate the origin of goods to which to which the hologram 100 is affixed, for example. It will be appreciated that such functions of the data within the hologram 100 may require that the hologram 100 be difficult to copy, as otherwise an incorrect person and/or object to which the hologram is affixed may be incorrectly identified as secure, verified, validated, identified and/or authenticated. Accordingly, there may be synergy between including such data 100 within the hologram 100 and the use of the first image 110 having a lenticular lens layer 111 and corresponding first and second interlaced images 114,115.

As illustrated with reference to FIG. 2, the lenticular image layer 113 may include at least one further interlaced image 116 corresponding with the array of lenticules 112. Including further interlaced images allows the hologram 100 to contain further images within a given size of hologram 100. It will also be appreciated that, as the image 110 within the hologram 100 is more complex it may be even more difficult to copy.

The first image 110 may include multiple further images, for example, two, three, four, five, six, or more further images.

As with the first and second interlaced images 114,115, the at least one further interlaced image 116 may include further data. The further data may include security, verification, validation, identification and/or authentication data.

At least two of the first, second, and/or further data may contain co-encrypted elements. For example, the first data may contain encrypted data and the second data may contain an encryption key (for example, a public or private encryption key). In this way when the hologram is read, the first data can be decrypted using the encryption key of the second data. The encryption may be such that decryption requires special software or decryption keys or algorithms. Accordingly, if the data within the hologram 100 is in such a format that corruption is likely upon copying, a would be copyist would not be able to determine whether or not he had successfully copied the hologram 100 unless he were also able to decrypt the data within the hologram, which may be difficult and/or impossible without the relevant tool (e.g. special software or decryption keys or algorithms). Accordingly, at least two of the first, second, and/or further data containing co-encrypted elements may be synergistic with other features of the hologram 100, in that it may be yet harder to copy.

The first, second and/or further images may be or comprise a lenticular arrangement as described in GB2514562 or GB2514633.

As will be described in more detail below with reference to FIG. 4, the first optical interference structure may replay the first image 110 upon illumination with a first wavelength of light. The holographic medium 102 may also include a second optical interference structure which replays a second image (not shown in FIG. 1) upon illumination with a second wavelength of light. Additionally, the hologram 100 may include any of the other features of the hologram described with reference to FIG. 4. In this way, the hologram 100 may carry even more data and/or may be made yet harder to copy.

As will be described in more detail below with reference to FIG. 5, the first optical interference structure may replay the first image 110 upon illumination at a first angle. The holographic medium 102 may also include a second optical interference structure which replays a second image (not shown in FIG. 1) upon illumination at a second angle. Additionally, the hologram 100 may include any of the other features of the hologram described with reference to FIG. 5. In this way, the hologram 100 may carry even more data and/or may be made yet harder to copy.

As will be described in more detail below with reference to FIGS. 6 and 7, the first optical interference structure may replay the first image at a first apparent depth upon illumination. The holographic medium 102 may also include a second optical interference structure which replays a second image (not shown in FIG. 1) at a second apparent depth upon illumination. Additionally, the hologram 100 may include any of the other features of the hologram described with reference to FIGS. 6 and 7. In this way, the hologram 100 may carry even more data and/or may be made yet harder to copy.

The hologram 100 may be made by recording in a holographic medium 102 a first optical interference structure which replays the image 110 of a lenticular lens layer 111 including an array of lenticules 112 and a lenticular image layer 113 including first and second interlaced images 114, 115 corresponding with the array of lenticules.

The image 110 may be recorded in the holographic medium 102 in such a way that the optical interference structure replays the image 110 in either an in-line or an off-axis manner. In in-line playback the hologram 100 is viewed from the same vantage point as from which it is illuminated. In off-axis playback the hologram 100 is viewed from a different location from which it is illuminated.

The choice of the reconstruction method is driven by the hologram recording conditions such as laser wavelength (where a laser is used) and the materials from which the holographic medium 102 is made. When recording the hologram, adjustable magnification methods may be used to allow the reconstruction of the recorded lenticular array to seem independent from the chosen scheme (in-line or off-axis). A possible advantage of this method of making the hologram 100 is that the reconstruction of the first image 110, can retain a monochromatic replay if viewed in white light.

Another possible advantage of this method of making the hologram 100, is that multiple images 114,115,116 may be recorded in the holographic medium 102 without multiple exposures of the holographic medium 102. This can potentially result in a more efficient hologram 100 than recording multiple images with multiple exposures in a single holographic medium.

Figure 3:
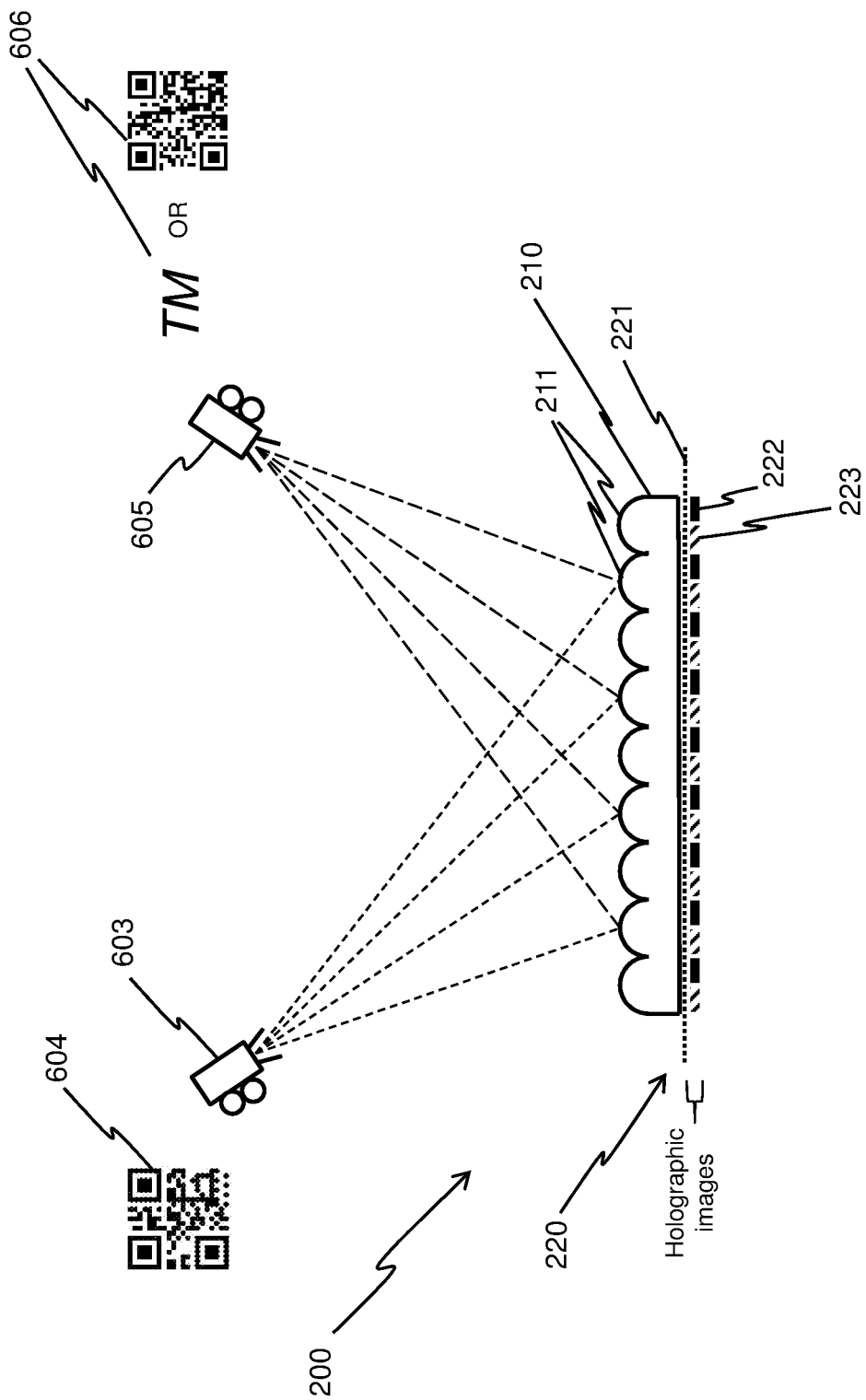
FIG. 3 shows a schematic illustration of a combination of a lenticular lens layer on a hologram.

Referring to FIG. 3, there is shown a combination 200 of a lenticular lens layer 210 on a hologram 220. The lenticular lens layer 210 includes an array of lenticules 211. The hologram 220 includes a holographic medium lenticular image layer 221.

The lenticular image layer 221 includes a first interlaced interference structure and second interlaced interference structure. The first and second interlaced interference structures correspond with the array of lenticules 211. The first interference structure replays a first image 222 upon illumination. The second interference structure replays a second image 223 upon illumination.

The first and second images 222,223 may correspond with the array of lenticules 211 instead of the first and second interlaced interference structures corresponding with the array of lenticules 211. Alternatively, the first and second images 222,223 may also correspond with the array of lenticules 211 as well as the first and second interlaced interference structures corresponding with the array of lenticules 211.

The combination could be described as follows: A combination 200 of a lenticular lens layer 210 on a hologram 220, the lenticular lens layer 210 including an array of lenticules 211; and the hologram 220 including a holographic image 221 of a lenticular image layer, the lenticular image layer including first and second interlaced optical interference structures corresponding with the array of lenticules 211; wherein the first optical interference structure replays a first image 222 upon illumination at a first angle; and the second optical interference structure replays a second image 223 upon illumination at a second angle. As will be appreciated, the first and second angles will usually be different. In other words, the hologram may be described as including a holographic image of a lenticular image layer.

Because the first and second interlaced interference structures correspond with the array of lenticules 112, when the combination 200 is viewed from a first angle the first interlaced image 222 is viewable and when the combination 200 is viewed from a second angle the second interlaced image 223 is viewable. This is illustrated in FIG. 3. When viewed from a first location, and thereby a first angle, for example when viewed by a first camera 603, the first interlaced image 222 is viewable. When viewed from the first location the first interlaced image can appear as a complete view 604. A possible view 604 of the complete first interlaced image is shown in FIG. 3 adjacent the camera 603. Similarly, when viewed from a second location, and thereby a second angle, for example when viewed by a second camera 605 the second interlaced image 223 is viewable. When viewed from the second location the second interlaced image can appear as a complete view 606. A possible view 606 of the complete second interlaced image is shown in FIG. 3 adjacent the camera 605.

As will be apparent, the first and second images 222,223 replayed by the first and second optical interference structures are holographic images. Accordingly, although the first and second images 222,223 are depicted as two-dimensional views 604,606 in FIG. 3, the first and second images 222,223 may be three-dimensional images.

As with the hologram 100 illustrated with reference to FIGS. 1 and 2, the first image 222 may include first data. Similarly, the second image 223 may include second data. The first and/or second data may also include security, verification, validation, identification and/or authentication data. Similar advantages may be realised as those discussed with reference to the hologram 100 and FIGS. 1 and 2.

The holographic medium lenticular image layer 221 may include at least one further interlaced interference structure corresponding with the array of lenticules 211 and the at least one further interlaced interference structure may replay a further image (not shown) upon illumination. Including further interlaced images allows the combination 200 to contain further images within a given size of combination 200. It will also be appreciated that, as the lenticular image layer within the combination 200 is more complex it may be even more difficult to copy.

The further image(s) may correspond with the array of lenticules 211 instead of the further interlaced interference structure(s) corresponding with the array of lenticules 211. Alternatively, the further image(s) may also correspond with the array of lenticules 211 as well as the further interlaced interference structure(s) corresponding with the array of lenticules 211.

As with the first and second images 222,223, the at least one further interlaced image may include further data. The further data may include security, verification, validation, identification and/or authentication data.

At least two of the first, second, and/or further data may contain co-encrypted elements. This may provide similar advantages to those discussed above in relation to the hologram 100 illustrated in FIG. 1.

The first, second, and/or further images 222,223 may contain trademarks or other insignia or devices. For example, as illustrated in FIG. 3, the second image 223 may be a trade mark. It may be, for example, that the second image 223 is visible at most angles, whereas the first image 222 is only viewable at a discrete angle. For example, the first image 222 may only be viewable over a narrow range, for example, only viewable over a range of 10°, 5°, 3°, 2°, 1°. Of course, equally it may be that the first image 222 is viewable over a broad range and the second image 223 is viewable over a narrow range, such as 10°, 5°, 3°, 2°, 1°. Such arrangements may be advantageous. For example, it may be that the trademark (second image 223) appears predominantly when viewing the combination 200, however, when viewed from a particular angle the first image 222 becomes viewable. In this way the first image 222 can be effectively hidden within the combination 200.

The combination 200 may be viewable under natural light. For example, sun light or artificial room lighting. In such a case at least one of the first, second and/or further image 222,223 may be viewable under natural light.

It may be that the holographic medium lenticular image layer 221 replays the first, second and/or further images 222,223 achromatically, that is—without colour.

The combination 200 may be made by providing a lenticular lens layer 210 including an array of lenticules 211 and a hologram 220 including a holographic medium 221.

In a step of manufacture, the lenticular lens layer 210 may be affixed to the hologram using optical cement or optical adhesive, for example, an optical cement with a high refractive index.

The method also includes recording in the holographic medium the lenticular image layer 221 to provide the holographic medium lenticular image layer 221.

The recording includes recording in the holographic medium a first optical interference structure which replays the first image 222 upon illumination, and recording in the holographic medium a second optical interference structure which replays a second image 223 upon illumination. As will be appreciated, the first and second optical interference structures are interlaced interference structures and correspond with the array of lenticules 211.

As with the hologram 100, the holographic medium lenticular image layer 221 may be recorded in either an in-line or an off-axis manner. Similar considerations apply as for those discussed above in relation to the hologram 100 shown in FIGS. 1 and 2.

Figure 4:
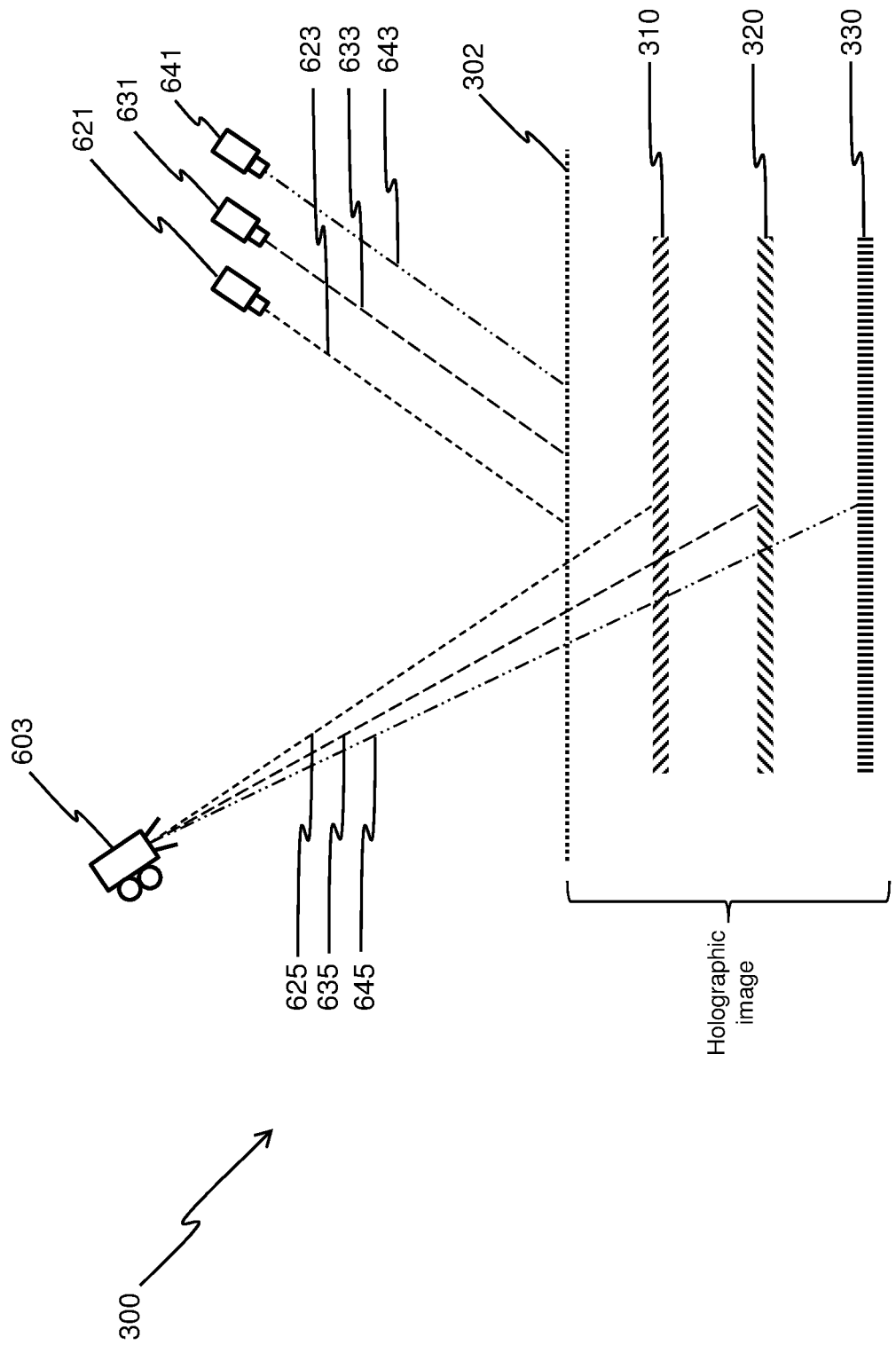
FIG. 4 shows a schematic illustration of an embodiment of a hologram which replays a first image upon illumination with a first wavelength of light and replays a second image upon illumination with a second wavelength of light.

Referring to FIG. 4, there is shown a volume hologram 300 including a holographic medium 302. The holographic medium 302 includes a first optical interference structure which replays a first image 310 including first data upon illumination with a first wavelength of light 623. The holographic medium 302 also includes a second optical interference structure which replays a second image 320 including second data upon illumination with a second wavelength of light 633.

In a similar way to FIG. 1 (above), the first and second images 310,320 are illustrated schematically in FIG. 4, as they may be viewed by an observer. However, it must be understood that the first and second images 310,320 are replayed by the first and second optical interference structures of the holographic medium 302. The first and second images 310,320 are not physical entities within the hologram 300, although it is illustrated as such in FIG. 4 for explanatory purposes.

In FIG. 4, as with FIG. 1 (above), light waves 623,633, 643 from light sources 621,631,641 are shown incident upon the holographic medium 302 of the hologram 300. Further, light waves 625,635,645 replayed by the holographic medium 302 of the hologram 300 are shown traveling towards the first camera 603. These light waves 625,635,645 are shown emanating from the first, second and further images 310,320,330 for explanatory purposes. However, it will be appreciated that the light waves 625,635,645 in fact emanate from the holographic medium 302 of the hologram, specifically from the first, second and further optical interference structures of the holographic medium 302.

It will be appreciated, therefore, that the hologram 300 may be advantageous.

First, the hologram may, by replaying the first and second images 310,320 upon illumination with a different wavelengths of light, enable a smaller holographic medium to be required to replay both first and second images 310,320 than if they were displayed upon illumination with the same wavelengths of light, for example if the images were arranged side-by-side. The hologram 300 can therefore provide an environmental benefit, in that less holographic medium may be required in order to replay a given size of total image.

Further, optical copying of the hologram can be made more difficult. First, when attempting to copy the hologram optically a would be copyist does not necessarily know what wavelengths of light to illuminate the hologram with in order to observe the first image 310 and/or the second image 320. For example, if a would be copyist knows that a first wavelength of light 623 can be used to replay the first image 310, he may be unaware that a second wavelength of light can be used to replay the second image 320. Accordingly, such copies can be found to be copies my illuminating the hologram 300 with a second wavelength of light 643 and observing that the second image 320 is not present or viewable.

The holographic medium 302 may further include at least one further optical interference structure which replays a further image 330 including further data upon illumination with a further wavelength of light. Including such a further image 330 allows the hologram to contain further images and data within a given size of hologram. Such a hologram 300 may carry even more data and/or may be even harder to copy, as it is more complex.

The holographic medium 302 may include multiple further images 330, for example, two, three, four, five, six or more further images.

The first, second, or further wavelengths may be chosen to be any suitable wavelengths for the type of material used for the holographic medium 302. The use of such multiple wavelengths with a single hologram may be known as a multi-spectral hologram.

In an example, the holographic medium 302 may be or comprise a photopolymer. The first, second, or further wavelengths may be 457 nm, 532 nm or 633 nm. However, any suitable wavelengths may be used.

For example, the first wavelength of light 623 may be provided by a first laser 621, and the first wavelength may be 457 nm. The second wavelength of light 633 may be provided by a second laser 631, and the second wavelength may be 532 nm. The further wavelength of light 643 may be provided by a further laser 641, and the further wavelength may be 633 nm. Additionally or alternatively, the first, second and/or further wavelength of light 621,631,641 may be provided by an LED.

As is illustrated in FIG. 4, when the first laser 621 is on a camera 603 may be able to view the first image 310, illustrated by light 625. Similarly, when the second laser 631 is on a camera 603 may be able to view the second image 320, illustrated by light 635. Further, when the further laser 641 is on, a camera 603 will be able to view the further image 330, illustrated by light 645. However, it will be appreciated that the light 625,635,643 is not real within the holographic image but is merely illustrated for explanatory purposes.

The first, second, and/or further data may include security, verification, validation, identification and/or authentication data. Inclusion of such data may be advantageous for the reasons given above with respect to the hologram 100 described with reference to FIGS. 1 and 2.

The first, second and/or further data may contain co-encrypted elements. Inclusion of such co-encrypted elements may be advantageous for the reasons given above with respect to the hologram 100 described with reference to FIGS. 1 and 2.

Figure 2:
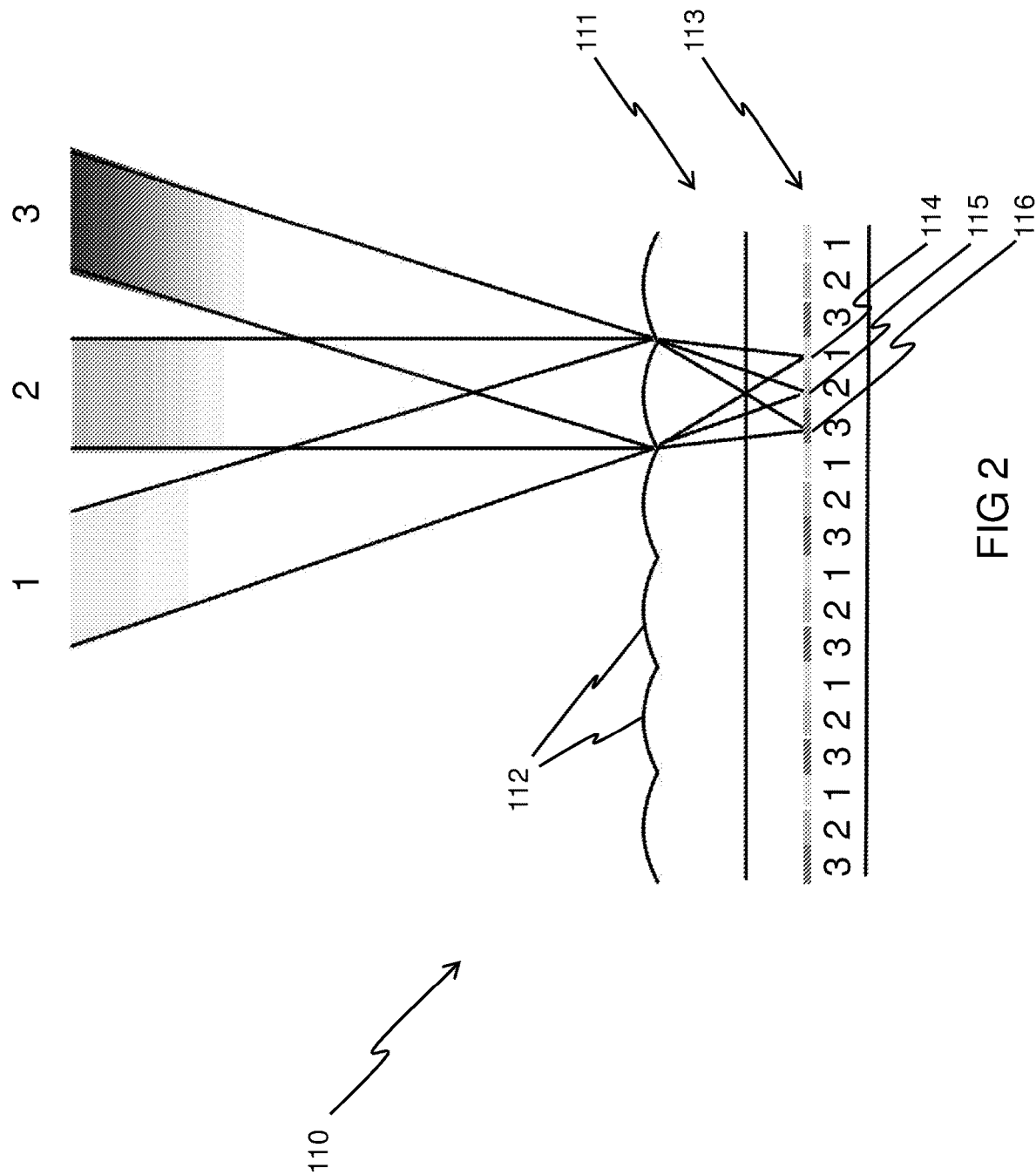
FIG. 2 shows a schematic illustration of an example lenticular lens layer and a lenticular image layer for forming the first image of the hologram of FIG. 1.

As described in detail above with reference to FIGS. 1 and 2, the first, second, and/or further image 310,320,330 may include a lenticular lens layer including an array of lenticules and a lenticular image layer including first and second interlaced images corresponding with the array of lenticules. Additionally, the hologram 300 may include any of the other features of the hologram described with reference to FIGS. 1 and 2. In this way, the hologram 300 may carry even more data and/or may be made yet harder to copy.

As will be described in more detail below with reference to FIG. 5, the first optical interference structure may replay the first image 310 upon illumination at a first angle. The second optical interference structure may replay the second image 320 upon illumination at a second angle. The at least one further optical interference structure may replay the further image 330 upon illumination at a further angle. Additionally, the hologram 300 may include any of the other features of the hologram described with reference to FIG. 5. In this way, the hologram 300 may carry even more data and/or may be made yet harder to copy.

As will be described in more detail below with reference to FIGS. 6 and 7, the first optical interference structure may replay the first image 310 at a first apparent depth upon illumination. The second optical interference may structure replay the second image 320 at a second apparent depth upon illumination. The at least one further optical interference structure may replay the further image 330 at a further apparent depth upon illumination. Additionally, the hologram 300 may include any of the other features of the hologram described with reference to FIGS. 6 and 7. In this way, the hologram 300 may carry even more data and/or may be made yet harder to copy.

The hologram 300 may be made by a method including recording in a holographic medium 302 a first optical interference structure which replays the first image 310 including first data upon illumination with a first wavelength of light. The method also includes recording a second optical interference structure in the holographic medium 302 which replays a second image 320 including second data upon illumination with a second wavelength of light.

The method may further include recording in the holographic medium 302 at least one further optical interference structure which replays a further image 330 including further data upon illumination with a further wavelength of light.

Typically, the wavelengths of light used to record the optical interference structures within the holographic medium 302 correspond with the wavelengths of light used to replay the images.

As with the hologram 100, the holographic medium lenticular image layer 302 may be recorded in either an in-line or an off-axis manner. Similar considerations apply as for those discussed above in relation to the hologram 100 shown in FIGS. 1 and 2.

Figure 5:
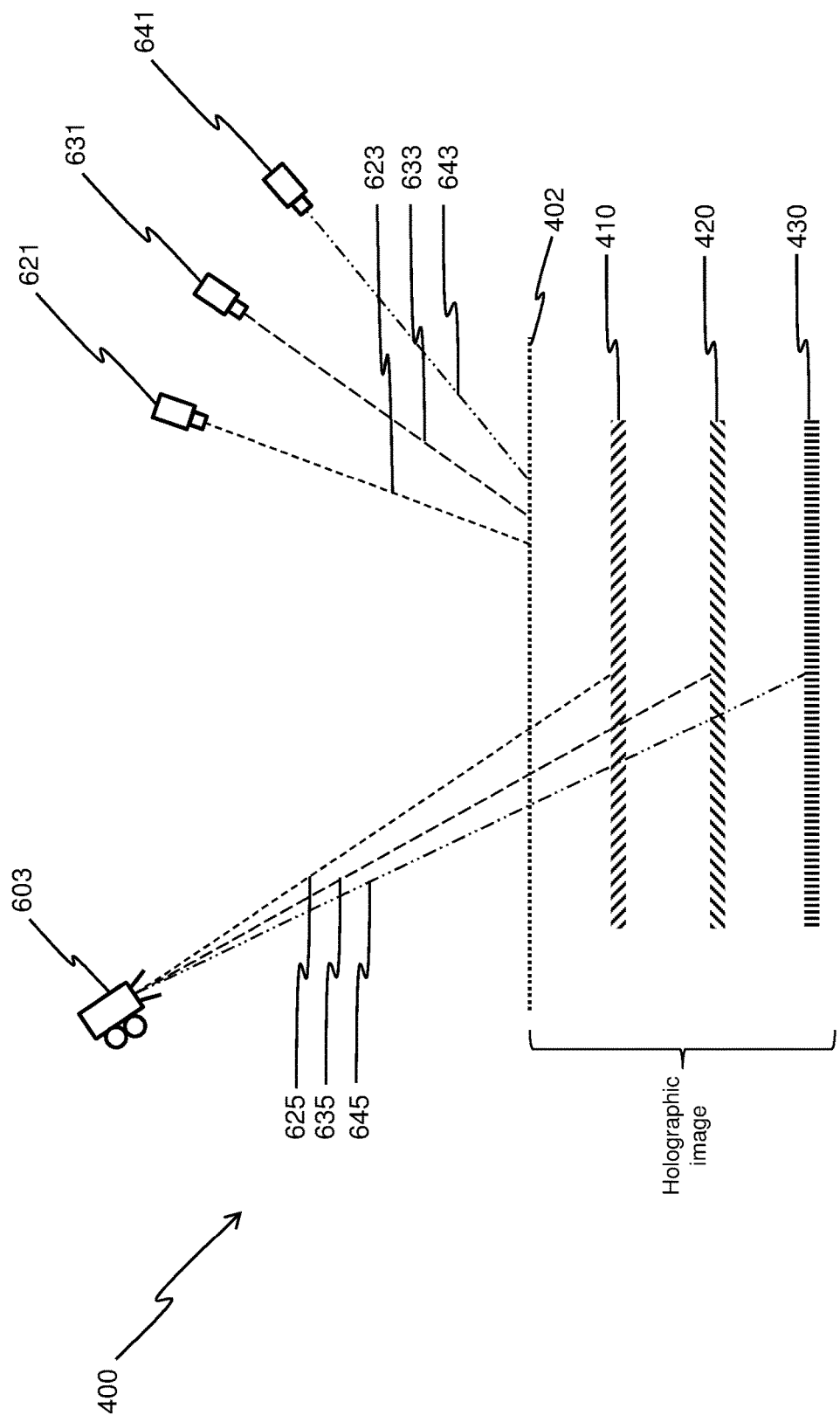
FIG. 5 shows a schematic illustration of an embodiment of a hologram which upon illumination at a first angle replays a first image and upon illumination at a second angle replays a second image.

Referring to FIG. 5, there is shown a volume hologram 400 including a holographic medium 402. The holographic medium 402 includes a first optical interference structure which upon illumination at a first angle replays a first image 410 including first data. The holographic medium 402 also includes a second optical interference structure which upon illumination at a second angle replays a second image 420 including second data.

In a similar way to FIGS. 1 and 4 (above), the first and second images 410,420 are illustrated schematically in FIG. 5, as they may be viewed by an observer. However, it must be understood that the first and second images 410,420 are replayed by the first and second optical interference structures of the holographic medium 402. The first and second images 410,420 are not physical entities within the hologram 400, although they are illustrated as such in FIG. 4 for explanatory purposes.

In FIG. 5, as with FIGS. 1 and 4 (above), light waves 623,633,643 from light sources 621,631,641 are shown incident upon the holographic medium 402 of the hologram 400. Further, light waves 625,635,645 replayed by the holographic medium 402 of the hologram 400 are shown travelling towards the first camera 603. These light waves 625,635,645 are shown emanating from the first, second and further images 410,420,430 for explanatory purposes. However, it will be appreciated that the light waves 625,635,645 in fact emanate from the holographic medium 402 of the hologram, specifically from the first, second and further optical interference structures of the holographic medium 402.

It will be appreciated, therefore, that the hologram 400 may be advantageous. First, the hologram may, by replaying first and second images 410,420 upon illumination at different angles, replay both first and second images 410,420 with a smaller holographic medium than might be required to replay both first and second images 410,420 if they were not displayed upon illumination at different angles, for example if the images were arranged side-by-side. The hologram 400 can therefore provide an environmental benefit, in that less holographic medium may be required in order to replay a given size of total image.

Further, optical copying of the hologram can be made more difficult. First, when attempting to copy the hologram optically a would be copyist does not necessarily know what angles to illuminate the hologram at in order to observe the first image 410 and/or the second image 420. For example, if a would be copyist knows that light 623 at a first angle can be used to replay the first image 410, he may be unaware that light 633 at a second angle can be used to replay the second image 420. Accordingly, such copies can be found to be copies my illuminating the hologram 400 at the second angle and observing that the second image 420 is not present or viewable.

The holographic medium may further include at least one further optical interference structure which upon illumination at a further angle replays a further image 430 including further data. Including such a further image 430 allows the hologram to contain further images and data within a given size of hologram. Such a hologram 400 may carry even more data and/or may be even harder to copy, as it is more complex.

The holographic medium 402 may include multiple further images 430, for example, two, three, four, five, six or more further images.

The first, second, or further angles may be chosen to be any suitable angles for the type of material used for the holographic medium 302.

It may be, for example, that the first image 410 is visible at most angles of illumination, whereas the second image 420 is only viewable at a discrete angle of illumination. For example, the second image 420 may only be viewable over a narrow range of illumination, for example, only viewable over a range of 10°, 5°, 3°, 2°, 1°. Of course, equally it may be that the second image 420 is viewable over a broad range of illumination and the first image 410 is viewable over a narrow range of illumination, such as 10°, 5°, 3°, 2°, 1°. Such arrangements may be advantageous. For example, it may be that the first image 410 appears predominantly when generally viewing the hologram 400, however, when viewed illuminated from a particular angle the second image 420 becomes viewable. In this way the second image 420 can be effectively hidden within the hologram 400. Therefore, a would be copyist may make a copy of the hologram 400 which does not include the second image 420. Accordingly, such copies can be found to be copies my illuminating the hologram 400 at the second angle and observing that the second image 420 is not present or viewable. Accordingly, optical copying of the hologram can be made more difficult.

The first, second, and/or further data may include security, verification, validation, identification and/or authentication data. Inclusion of such data may be advantageous for the reasons given above with respect to the hologram 100 described with reference to FIGS. 1 and 2.

The first, second, and/or further data may contain co-encrypted elements. Inclusion of such co-encrypted elements may be advantageous for the reasons given above with respect to the hologram 100 described with reference to FIGS. 1 and 2.

As described in detail above with reference to FIGS. 1 and 2, the first, second, and/or further image 410,420,430 may include a lenticular lens layer including an array of lenticules and a lenticular image layer including first and second interlaced images corresponding with the array of lenticules. Additionally, the hologram 400 may include any of the other features of the hologram described with reference to FIGS. 1 and 2. In this way, the hologram 400 may carry even more data and/or may be made yet harder to copy.

As described in detail above with reference to FIG. 4, the first optical interference structure may replay the first image 410 upon illumination with a first wavelength of light. The second optical interference structure may replay the second image 420 upon illumination with a second wavelength of light. The at least one further optical interference structure may replay the further image upon illumination with a further wavelength of light. Additionally, the hologram 400 may include any of the other features of the hologram described with reference to FIG. 4. In this way, the hologram 400 may carry even more data and/or may be made yet harder to copy.

As will be described in more detail below with reference to FIGS. 6 and 7, the first optical interference structure may replay the first image 410 at a first apparent depth upon illumination. The second optical interference structure may replay the second image 420 at a second apparent depth upon illumination. The at least one further optical interference structure may replay the further image 430 at a further apparent depth upon illumination. Additionally, the hologram 400 may include any of the other features of the hologram described with reference to FIGS. 6 and 7. In this way, the hologram 400 may carry even more data and/or may be made yet harder to copy.

The hologram 400 may be made by a method including recording in a holographic medium 402 a first optical interference structure which replays a first image 410 including first data upon illumination at a first angle. The method also includes recording a second optical interference structure which replays a second image 420 including second data upon illumination at a second angle.

The method may further include recording in the holographic medium 402 at least one further optical interference structure which replays a further image 430 including further data upon illumination at a further angle.

As with the hologram 100, the first, second and/or further images 410,420,430 may be recorded in either an in-line or an off-axis manner. Similar considerations apply as for those discussed above in relation to the hologram 100 shown in FIGS. 1 and 2.

Figure 6:
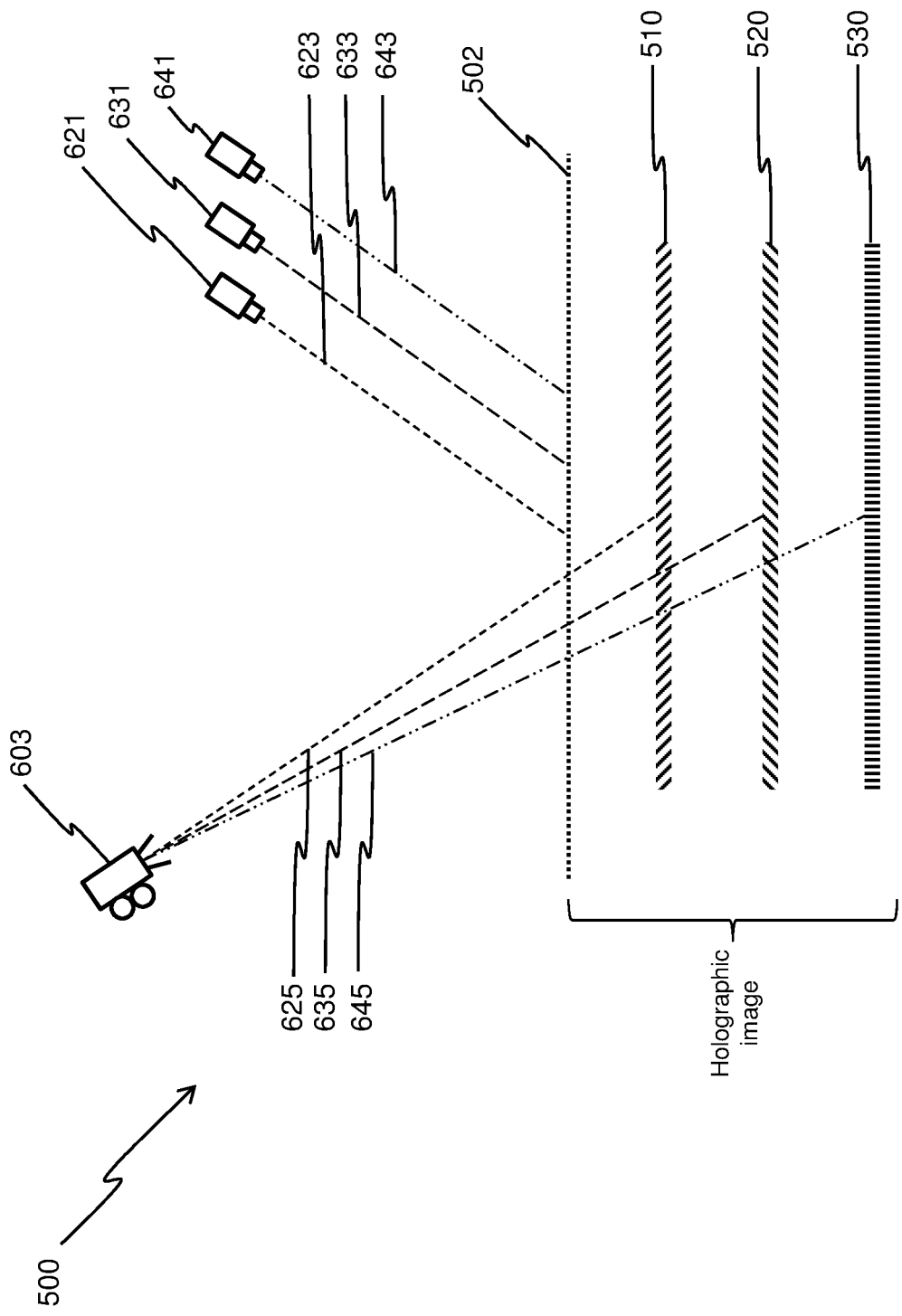
FIG. 6 shows a schematic illustration of an embodiment of a hologram which replays a first image at a first apparent depth and a second image at a second apparent depth.
Figure 7:
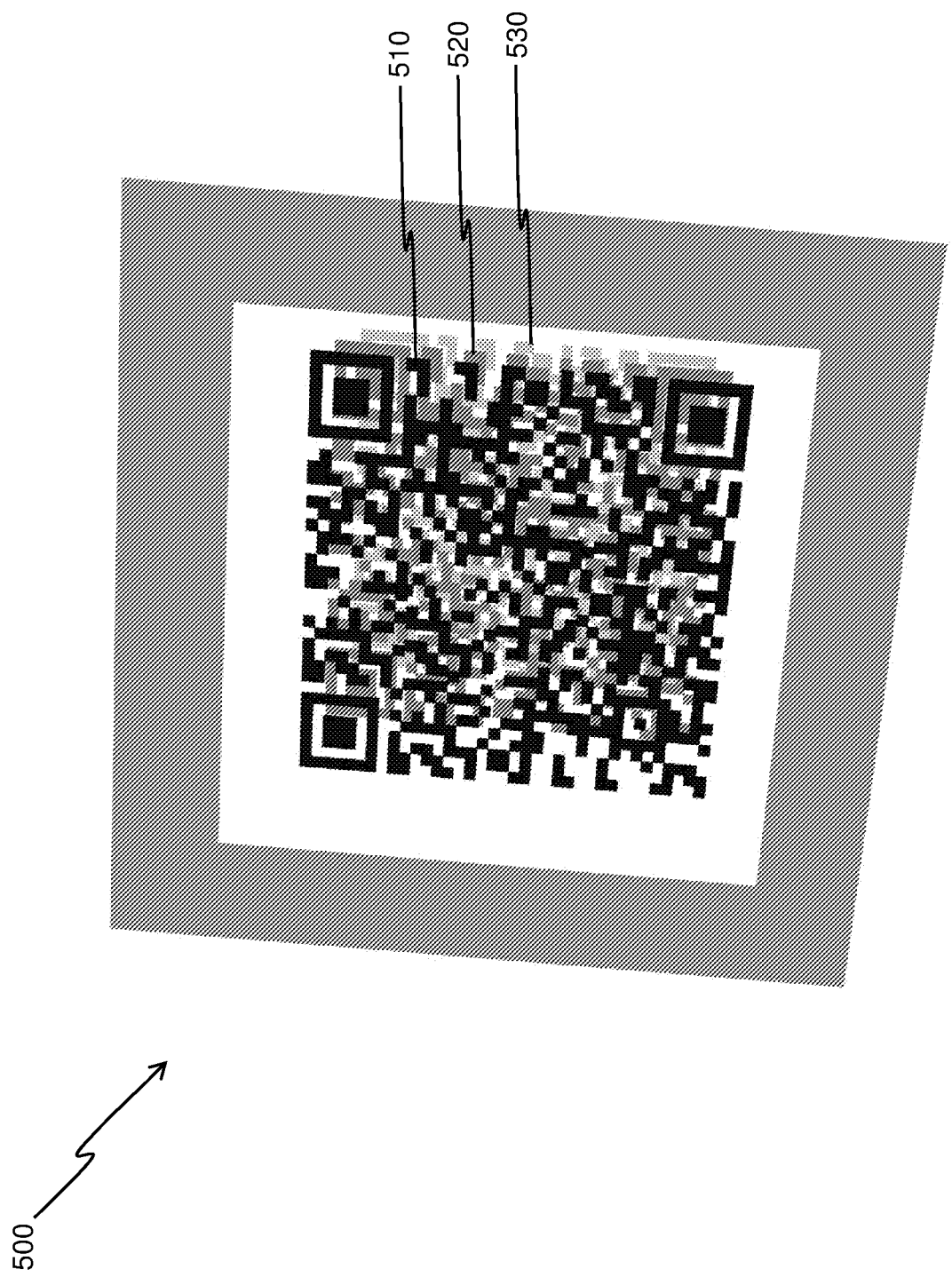
FIG. 7 shows a perspective view of the holographic image replayed by the hologram of FIG. 6.

Referring to FIGS. 6 and 7, there is shown a volume hologram 500 including a holographic medium 502. The holographic medium 502 includes a first optical interference structure which upon illumination replays a first image 510 including first data at a first apparent depth. The holographic medium 502 also includes a second optical interference structure which upon illumination replays a second image 520 including second data at a second apparent depth.

In a similar way to FIGS. 1, 4, and 5 (above), the first and second images 510,520 are illustrated schematically in FIGS. 6 and 7, as they may be viewed by an observer. However, it must be understood that the first and second images 510,520 are replayed by the first and second optical interference structures of the holographic medium 502. The first and second images 510,520 are not physical entities within the hologram 500, although they are illustrated as such in FIGS. 6 and 7 for explanatory purposes.

In FIG. 6, as with FIGS. 1, 4 and 5 (above), light waves 623,633,643 from light sources 621,631,641 are shown incident upon the holographic medium 502 of the hologram 500. Further, light waves 625,635,645 replayed by the holographic medium 502 of the hologram 500 are shown travelling towards the first camera 603. These light waves 625,635,645 are shown emanating from the first, second and further images 510,520,530 for explanatory purposes. However, it will be appreciated that the light waves 625,635,645 in fact emanate from the holographic medium 502 of the hologram, specifically from the first, second and further optical interference structures of the holographic medium 502.

It will be appreciated, therefore, that the hologram 500 may be advantageous. First, the hologram 500 may, by replaying first image 510 at a different depth from the depth of the second image 520, replay both first and second images 510,520 with a smaller holographic medium than might be required to replay both first and second images 510,520 if they were not displayed at different depths, for example if the images were arranged side-by-side. The hologram 500 can therefore provide an environmental benefit, in that less holographic medium may be required in order to replay a given size of total image.

Further, optical copying of the hologram 500 can be made more difficult. When attempting to copy the hologram 500 optically a would be copyist may not be able to fully observe the first and second images 510,520, as they are overlapping. Accordingly, the would be copyist may not be able to produce a copy of the hologram 500.

The holographic medium 502 may further include at least one further optical interference structure which upon illumination replays a further image 530 including further data at a further depth. Including such a further image 530 allows the hologram to contain further images and data within a given size of hologram. Such a hologram 500 may carry even more data and/or may be even harder to copy, as it is more complex.

The holographic medium 502 may include multiple further images 530, for example, two, three, four, five, six or more further images.

The first, second, and/or further data may include security, verification, validation, identification and/or authentication data. Inclusion of such data may be advantageous for the reasons given above with respect to the hologram 100 described with reference to FIGS. 1 and 2.

The first, second, and/or further data may contain co-encrypted elements. Inclusion of such co-encrypted elements may be advantageous for the reasons given above with respect to the hologram 100 described with reference to FIGS. 1 and 2.

As described in detail above with reference to FIGS. 1 and 2, the first, second, and/or further image 510,520,530 may include a lenticular lens layer including an array of lenticules and a lenticular image layer including first and second interlaced images corresponding with the array of lenticules. Additionally, the hologram 500 may include any of the other features of the hologram described with reference to FIGS. 1 and 2. In this way, the hologram 500 may carry even more data and/or may be made yet harder to copy.

As described in detail above with reference to FIG. 4, the first optical interference structure may replay the first image 510 upon illumination with a first wavelength of light. The second optical interference structure may replay the second image 520 upon illumination with a second wavelength of light. The at least one further optical interference structure may replay the further image 530 upon illumination with a further wavelength of light. Additionally, the hologram 500 may include any of the other features of the hologram described with reference to FIG. 4. In this way, the hologram 500 may carry even more data and/or may be made yet harder to copy.

As described in detail above with reference to FIG. 5, the first optical interference structure may replay the first image 510 upon illumination at a first angle. The second optical interference structure may replay the second image 520 upon illumination at a second angle. The at least one further optical interference structure 530 may replay the further image upon illumination at a further angle. Additionally, the hologram 500 may include any of the other features of the hologram described with reference to FIG. 5. In this way, the hologram 500 may carry even more data and/or may be made yet harder to copy.

The hologram 500 may be made by a method including recording in a holographic medium 502 a first optical interference structure which replays a first image 510 including first data at a first apparent depth and recording a second optical interference structure which replays a second image 520 including second data at a second apparent depth.

The method may further include recording in the holographic medium 502 at least one further optical interference structure which replays a further image 530 including further data upon illumination at a further angle.

As with the hologram 100, the first, second and/or further images 510,520,530 may be recorded in either an in-line or an off-axis manner. Similar considerations apply as for those discussed above in relation to the hologram 100 shown in FIGS. 1 and 2.

The holograms 100,300,400,500 and combinations 200 have many uses. For example, the holograms 100,300,400, 500 and combinations 200 may be included in security markers.

The holograms 100,300,400,500 and combinations 200 may be included in an article. The articles may be high value items, such as designer goods, video media or bank notes.

The holograms 100,300,400,500 and combinations 200 may be included in packaging or labelling. The packaging may be packaging for articles, such as high value items, for example designer goods or video media. An article may be provided with such packaging or labelling.

As will be apparent, including the holograms 100,300, 400,500 and combinations 200 in or on articles, packaging and/or labelling, can enable the authenticity of the article to be verified.

When used in this specification and claims, the terms "comprises" and "comprising" and variations thereof mean that the specified features, steps or integers are included. The terms are not to be interpreted to exclude the presence of other features, steps or components.

As will be appreciated, where an image is described as including data, the image could additionally or alternatively be described as containing data.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A volume reflection hologram including a holographic medium, the holographic medium including:
   a first optical interference structure which upon a first illumination at a first angle replays by reflection a first holographic recording of a first image including first data; and
   a second optical interference structure which upon a second illumination at a second angle different than the first angle replays by reflection a second holographic recording of a second image including second data.

2. A hologram according to claim 1, wherein the first and/or second data includes security, verification, validation, identification and/or authentication data.

3. A hologram according to claim 1, wherein the first and second data contain co-encrypted elements.

4. A hologram according to claim 1,
   wherein the first optical interference structure replays the first image upon illumination with a first wavelength of light; and
   wherein the second optical interference structure replays the second image upon illumination with a second wavelength of light.

5. A hologram according to claim 1,
   wherein the first optical interference structure replays the first image at a first apparent depth upon illumination; and
   wherein the second optical interference structure replays the second image at a second apparent depth upon illumination.

6. A volume hologram including a holographic medium, the holographic medium including:
   a first optical interference structure which upon a first illumination at a first angle replays a first holographic recording of a first image including first data; and
   a second optical interference structure which upon a second illumination at a second angle different than the first angle replays a second holographic recording of a second image including second data;
   wherein the first and/or second image includes a lenticular lens layer including an array of lenticules and a lenticular image layer including first and second interlaced images corresponding with the array of lenticules.

* * * * *